United States Patent
Milacic et al.

(10) Patent No.: US 12,240,321 B2
(45) Date of Patent: Mar. 4, 2025

(54) DISCONNECTING DIFFERENTIAL SIDE GEAR MECHANISM

(71) Applicant: Magna Powertrain, Inc., Aurora (CA)

(72) Inventors: Dusan Milacic, Aurora (CA); Sean Steele, Aurora (CA); Myron Samila, Aurora (CA); Stephen Yang, Aurora (CA); David Gelfand, Aurora (CA)

(73) Assignee: Magna Powertrain, Inc., Aurora (CA)

( * ) Notice: Subject to any disclaimer, the term of this patent is extended or adjusted under 35 U.S.C. 154(b) by 0 days.

(21) Appl. No.: 18/554,509

(22) PCT Filed: Apr. 13, 2022

(86) PCT No.: PCT/CA2022/050570
§ 371 (c)(1),
(2) Date: Oct. 9, 2023

(87) PCT Pub. No.: WO2022/217355
PCT Pub. Date: Oct. 20, 2022

(65) Prior Publication Data
US 2024/0198794 A1    Jun. 20, 2024

Related U.S. Application Data

(60) Provisional application No. 63/175,831, filed on Apr. 16, 2021.

(51) Int. Cl.
*B60K 23/08* (2006.01)
*B60K 17/02* (2006.01)
(Continued)

(52) U.S. Cl.
CPC ............ *B60K 23/08* (2013.01); *B60K 17/02* (2013.01); *B60K 17/165* (2013.01);
(Continued)

(58) Field of Classification Search
CPC ............... F16H 48/08; F16H 2048/405; F16H 48/40–2048/426; B60K 23/08;
(Continued)

(56) References Cited

U.S. PATENT DOCUMENTS

| 4,271,722 A | 6/1981 | Campbell |
| 4,625,584 A | 12/1986 | Onodera |

(Continued)

FOREIGN PATENT DOCUMENTS

JP    2004116730 A    4/2004

OTHER PUBLICATIONS

Canadian Intellectual Property Office, Gatineau, Quebec, Canada, International Search Report of International Application No. PCT/CA2022/050570, Mailed Jul. 11, 2022, 3 pages.

*Primary Examiner* — Tinh Dang
(74) *Attorney, Agent, or Firm* — Dickinson Wright PLLC

(57) ABSTRACT

A disconnectable differential assembly has a reduced axial length and a side gear disconnectable from an axle shaft via a clutch unit. Various components of the disconnect mechanism are axially aligned and concentric to reduce the axial length. An output hub splined on the axle shaft and is actuatable, via an axially shiftable armature, into toothed engagement with the side gear via respective axially extending teeth. The output hub and armature include radially extending flanges that are axially adjacent and radially aligned with the teeth so that force is transmitted to the teeth at the same diameter. A thrust bearing is disposed between the flanges so that the output hub rotates relative to the armature. The side gear is supported for rotation on the axle shaft, and a bearing is disposed radially therebetween to improve radial alignment of the second side gear with the output hub.

24 Claims, 8 Drawing Sheets

(51) Int. Cl.
*B60K 17/16* (2006.01)
*F16D 27/118* (2006.01)
*F16H 48/08* (2006.01)
*F16H 48/38* (2012.01)
*F16H 48/40* (2012.01)

(52) U.S. Cl.
CPC ........... *F16D 27/118* (2013.01); *F16H 48/08* (2013.01); *F16H 48/40* (2013.01); *F16D 2500/1022* (2013.01); *F16D 2500/10412* (2013.01); *F16D 2500/10462* (2013.01); *F16D 2500/1107* (2013.01); *F16H 2048/405* (2013.01)

(58) Field of Classification Search
CPC ................. B60K 17/165; F16D 27/118; F16D 2500/1022; F16D 2500/10412; F16D 2500/10462; F16D 2500/1107
See application file for complete search history.

(56) References Cited

U.S. PATENT DOCUMENTS

| | | | |
|---|---|---|---|
| 7,264,568 B2 * | 9/2007 | Ludwig | F16H 48/295 |
| | | | 475/233 |
| 8,050,829 B2 * | 11/2011 | Johnson | F16H 48/30 |
| | | | 701/88 |
| 8,858,384 B2 | 10/2014 | Fusegi et al. | |
| 9,500,268 B2 * | 11/2016 | Balenda, II | F16H 48/24 |
| 10,391,861 B2 | 8/2019 | Richards et al. | |
| 2005/0187063 A1 * | 8/2005 | Haruki | F16H 48/30 |
| | | | 475/231 |
| 2005/0279607 A1 * | 12/2005 | Fusegi | F16H 48/24 |
| | | | 192/84.96 |
| 2014/0004988 A1 * | 1/2014 | Yamanaka | F16H 48/24 |
| | | | 475/231 |
| 2016/0265639 A1 | 9/2016 | Peak | |
| 2017/0074380 A1 * | 3/2017 | Raghavan | F16D 27/118 |
| 2019/0195327 A1 * | 6/2019 | Creech | F16H 48/24 |
| 2019/0344661 A1 | 11/2019 | Richards et al. | |
| 2020/0094676 A1 * | 3/2020 | Creech | B60K 23/04 |

* cited by examiner

DISCONNECTING DIFFERENTIAL SIDE GEAR MECHANISM

CROSS-REFERENCE TO RELATED APPLICATIONS

This application claims the benefit of previously filed U.S. Provisional Patent Application No. 63/175,831, filed Apr. 16, 2021, the entire content of which is hereby incorporated by reference in its entirety.

FIELD

The present disclosure related generally to differential assemblies of the type used in motor vehicles and which are configured to include a differential housing, a differential mechanism, and a power-operated disconnect mechanism operable for selectively coupling and uncoupling one side gear of the differential. The present disclosure is also directed to an electrically powered driveline, such as an electric axle assembly, equipped with such a side gear disconnectable differential assembly.

BACKGROUND

This section provides background information related to the present disclosure which is not necessarily prior art.

In view of the recent commitment of most motor vehicle OEM's to development of electric vehicles (EV's), a great deal of engineering activity has been directed to efficiently packaging an electric powertrain for installation into electric vehicles. In many configurations, the electric powertrain is the exclusive or "primary" electric powertrain and is operable for generating and transmitting motive power (i.e., drive torque) to a single pair of wheels, typically the front wheels. However, attention has also been directed to development of EV's having a "secondary" electric powertrain, in addition to the primary electric powertrain, that is operable to generate and transmit motive power to the other pair of wheels, such as the rear wheels, to establish a four-wheel drive (4WD) vehicle. The secondary electric powertrain may include an electric motor driving a differential assembly, packaged as an electric drive axle. When the 4WD mode is not required, it is known to selectively "disconnect" the secondary electric powertrain by uncoupling the differential assembly from the electric motor via a power-operated disconnect device.

Based on the amount of attention currently directed to development of optimized secondary electric powertrains, the structure and functional interaction of the power-operated disconnect device disposed between the electric motor and the output of the differential assembly is important. Accordingly, a need exists to develop side gear "disconnectable" differential assemblies for use in secondary electric powertrain applications that are configured to advance the art.

SUMMARY

This section provides a general summary of the many aspects associated with the inventive concepts embodied in the teachings of the present disclosure and is not intended to be considered a complete listing of its full scope of protection nor all of its features and advantages.

The side gear disconnectable differential assembly of the present disclosure is configured to generally include a power transfer mechanism driven by the electric motor, a differential mechanism drivingly connected to the ground-engaging wheels, and a power-operated disconnect mechanism operable in a first or "Connected" mode to couple the output hub to a side gear and further operable in a second or "Disconnected" mode to uncouple output hub from the side gear.

It is an aspect of the present disclosure to provide a powertrain having a side gear disconnectable differential assembly which is configured for use in an electric vehicle drivetrain and/or driveline applications, and which embodies the inventive concepts set forth in the following detailed description and illustrated in the appended drawings.

In accordance with this aspect, the side gear disconnectable differential assembly of the present disclosure is generally associated with an electric powertrain and configured as an electrically-powered transaxle or drive axle of the type used in partially or fully electric vehicles for transmitting motive power (i.e. drive torque) from an electric motor to a pair of ground-engaging wheels.

In the non-limiting embodiment disclosed of the side gear disconnectable differential assembly associated with the present disclosure, the differential housing is adapted to be driven by the electric motor and includes an internal cavity. The differential mechanism is rotatably disposed within the internal cavity. A power-operated disconnect mechanism is configured external to the cavity to include a clutch unit disposed between one side gear and an output hub splined to an axle shaft, an electromagnetic actuator unit operable for shifting the disconnect mechanism between a first or "engaged" state to establish the connected mode and a second or "released" state to establish the disconnected mode.

The power-operated disconnect mechanism associated with the side gear disconnectable differential assembly is configured with a clutch unit having a first clutch member fixed for rotation with the side gear of the differential mechanism and a second clutch member coupled for rotation with the output axle shaft via an output hub. The output hub with the second clutch member is axially moveable between a first or "retracted" position where axially extended teeth on the second clutch member are disengaged from clutch teeth on the first clutch member to establish the clutch unit's "released" or disconnected state and a second or "extended" position where its axially extended teeth are drivingly engaged with the clutch teeth on the first clutch member to establish a clutch unit's "engaged" state. A biasing arrangement is provided for normally biasing the output hub and second clutch member toward its retracted position. The electromagnetic actuator unit is non-rotatably mounted in the transmission housing and includes an annular solenoid and a moveable actuation component, configured as a magnetic plunger. The plunger is mated to an armature which directly contacts the output hub and second clutch member thru a thrust bearing such that movement of the plunger between a first or "non-actuated" position and a second or "actuated" position results in corresponding movement of the output hub and second clutch member between its retracted and extended positions. Energization of the solenoid causes the plunger and armature to move from its non-actuated position into its actuated position in opposition to the biasing exerted by the biasing arrangement. De-energization of the solenoid permits the biasing arrangement to forcibly return the plunger and armature to its non-actuated position.

In accordance with a first non-limiting embodiment, the first clutch member is a face clutch with clutch teeth extending axially from the back face of the side gear, and the second clutch member is an output hub having a cylindrical sleeve central portion with internal splines and a radial portion with axially-extending clutch teeth extending towards the clutch teeth of the first clutch member and side gear. The internal splines on the cylindrical sleeve portion are in constant mesh with the external splines formed on the axle shaft to cause common rotation of the output hub with the axle shaft while permitting axial movement of the output hub. The axially extending teeth on the output hub are configured to be free from engagement with the axially extending teeth of the first clutch member and side gear when the output hub is located in its retracted position, which occurs when the solenoid is de-energized. A biasing device is configured to retract the output hub when the coil is not energized. The output hub is further configured to be driven when coupled to the side gear axially extending teeth when the output hub is located in its extended position when the solenoid is energized. The clutch actuation mechanism is configured to include a plunger, with an internally radially extending armature to position a thrust bearing, with the thrust bearing operably disposed between the armature and output hub to allow relative motion between the rotating output hub and the stationary armature, plunger and coil. When the side gear and the output hub are decoupled, power transfer is interrupted to one axle shaft. This results in the differential operating as an open differential and power transfer will not occur to the second axle shaft.

In another aspect, a differential assembly for a vehicle in the form of a disconnecting differential assembly is provided, including: a differential case being configured to rotate about a first axis; a differential mechanism received in said differential case having a plurality of differential pinions and first and second side gears transmitting power between the differential case and the first and second side gears; a first side gear rotationally fixed to a first axle shaft; a second side gear with axially extending teeth; an output hub with axially extending teeth which is rotationally fixed to a second axle shaft and axially shiftable relative to the second axle shaft toward and away from the second side gear; a power operated disconnect mechanism operable in a disconnected mode to uncouple the output hub from the second side gear and in a connected mode to couple the output hub to the second side gear; a control system for controlling operation of the power operated disconnect system; wherein the differential assembly has a reduced axial length.

In one aspect, the second side gear is support for rotation on the second axle shaft with a bearing element disposed radially therebetween, wherein the bearing element improves radial alignment between the output hub and the side gear for improved connecting and disconnecting therebetween.

In one aspect, the bearing element is a needle bearing.

In one aspect, the differential assembly includes an armature configured for axial movement relative to the side gear, the armature configured to move the output hub into engagement with the side gear.

In one aspect, the armature has a radially inwardly extending flange portion and the output hub has a radially outwardly extending flange portion, where the respective flange portions are radially aligned and axially offset, wherein an axial moving force is transmitted therebetween.

In one aspect, the differential assembly includes a thrust bearing disposed axially between the flange portions of the armature and the output hub, wherein the armature is rotationally stationary and the output hub is rotatable relative to the armature.

In one aspect, the flange portions are radially aligned with the axially extending teeth of the output hub and the side gear, such that force is transferred from the armature to the teeth of the side gear at the same radial location and diameter.

In one aspect, the output hub is biased away from the side gear and is normally disconnected.

In one aspect, the differential assembly includes a solenoid disposed radially outward from the armature and a plunger mounted to the armature, wherein actuation of the solenoid shifts the plunger and armature toward the output hub and the output hub toward the second side gear.

In one aspect, the solenoid, the plunger, the armature, and a sleeve portion of the output hub are concentrically arranged and axially aligned and arranged to define a radial stack-up surrounding the second axle shaft.

In one aspect, the radial stack-up is disposed axially inboard relative to an axially outer bearing that supports the second axle shaft for rotation.

In one aspect, the radial stack-up is arranged axially between the axially outer bearing and a further bearing assembly that supports a housing of the differential assembly.

In one aspect, the second bearing assembly is one of two bearing assemblies including the second bearing assembly and a third bearing assembly supporting opposite sides of the housing of the differential assembly, wherein the two bearing assemblies define an axial span, and the second bearing assembly is disposed radially outward relative to the first bearing assembly.

In one aspect, the second bearing assembly is disposed radially outward from the second side gear and axially aligned with the second side gear, wherein the second bearing assembly is radially aligned with the solenoid.

Further areas of applicability will become apparent from the detailed description and appended drawings to be disclosed herein. As such, the description and specific examples listed in this Summary section are intended for purposes of defining particular aspects and features of the present disclosure and are not intended to limit the scope of protection afforded to the inventive concepts.

BRIEF DESCRIPTION OF THE DRAWINGS

The drawings described herein are intended to illustrate several features of alternative and non-limiting embodiments without limiting the scope of protection afford to the inventive concepts associated with the present disclosure. The drawings include.

Corresponding reference numbers indicate corresponding components throughout the several views of the drawings.

DETAILED DESCRIPTION

Figure 1:
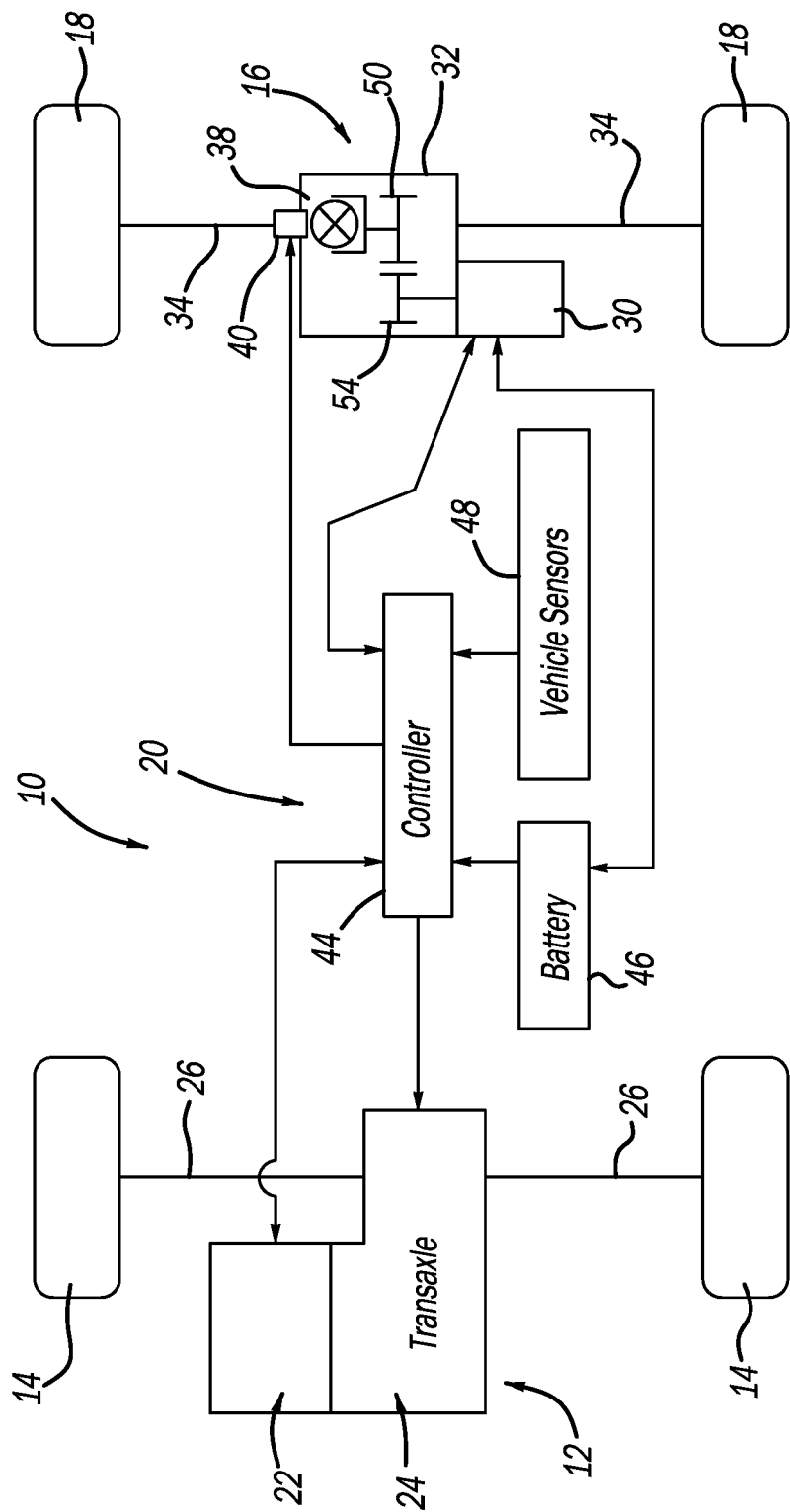
FIG. 1 is a diagrammatic illustration of a vehicle architecture for an exemplary electric vehicle (EV)

Example embodiments of various alternative configurations for disconnectable side gear differential assemblies which incorporate the inventive concepts of the present disclosure will now be more fully described with reference to the accompanying drawings. It is anticipated that those skilled in the art will fully comprehend all aspects, features and potential improvements associate with inventive concepts embodied in each of the alternative configurations shown in the drawings and described in detail herein.

As previously briefly described above, FIG. 1 is a diagrammatic illustration of a vehicle architecture for an exemplary electric vehicle (EV) equipped with a primary electrically-powered drivetrain for driving a set of primary (i.e. front) ground-engaging wheels, a secondary electrically-powered drivetrain for selectively driving a set of secondary (i.e. rear) ground-engaging wheels, and a control system for controlling operation of both the primary and secondary drivetrains.

Figure 2:
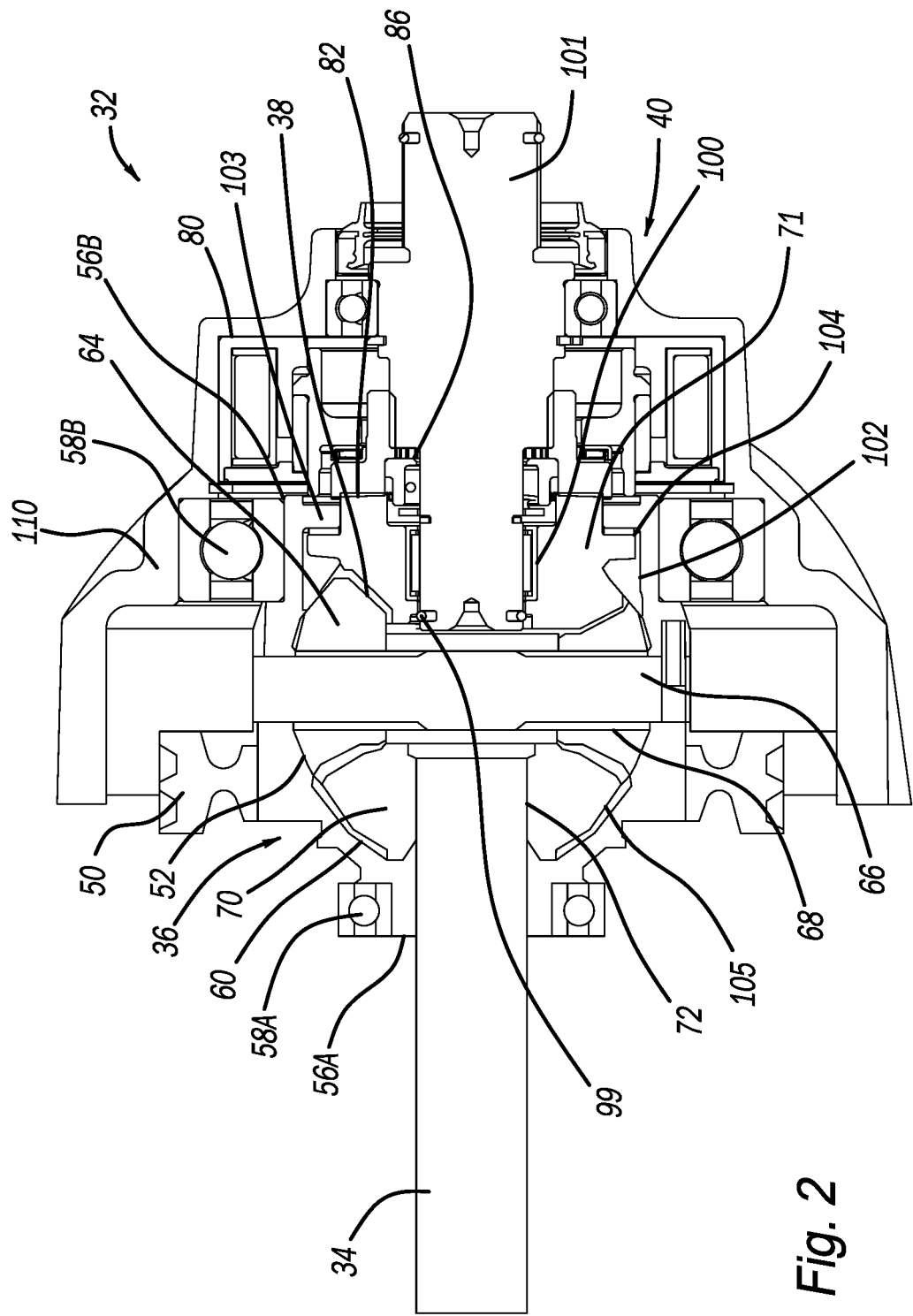
FIG. 2 is a sectional view of a disconnectable differential assembly associated with the secondary electrically-powered drivetrain shown in FIG. 1.

FIG. 2 is a sectional view of a disconnectable differential assembly associated with the secondary electrically-powered drivetrain shown in FIG. 1 and generally configured to include a differential housing, a differential mechanism, and a power-operated side gear disconnect mechanism.

Figure 3:
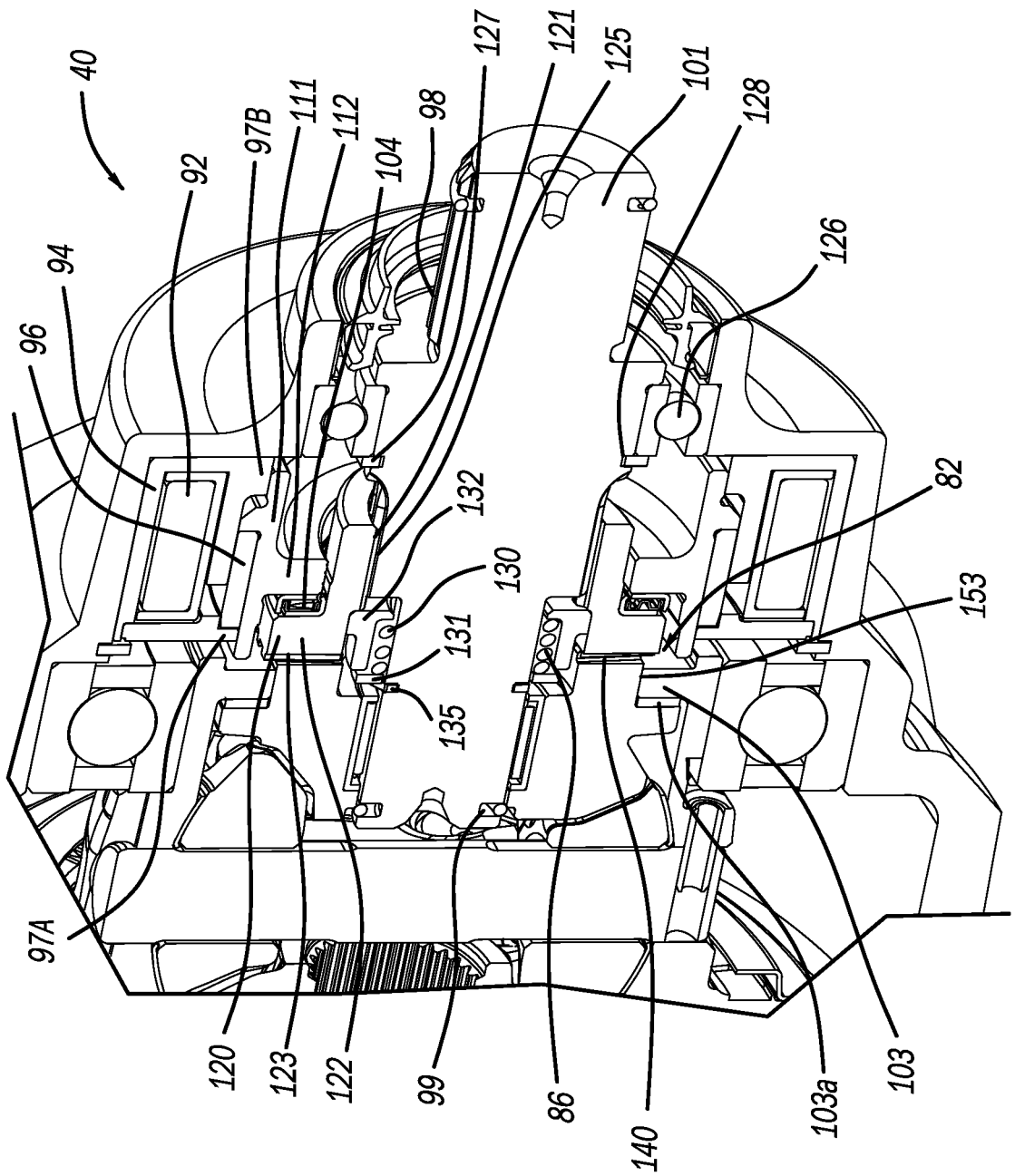
FIG. 3 is an isometric sectional view of the disconnectable differential assembly shown in FIG. 2.

FIG. 3 is an isometric sectional view of the disconnectable differential assembly shown in FIG. 2 with the power-operated side gear disconnect mechanism having an electromagnetic actuator unit operable to selectively shift a clutch unit between a first state and a second state.

Figure 4:
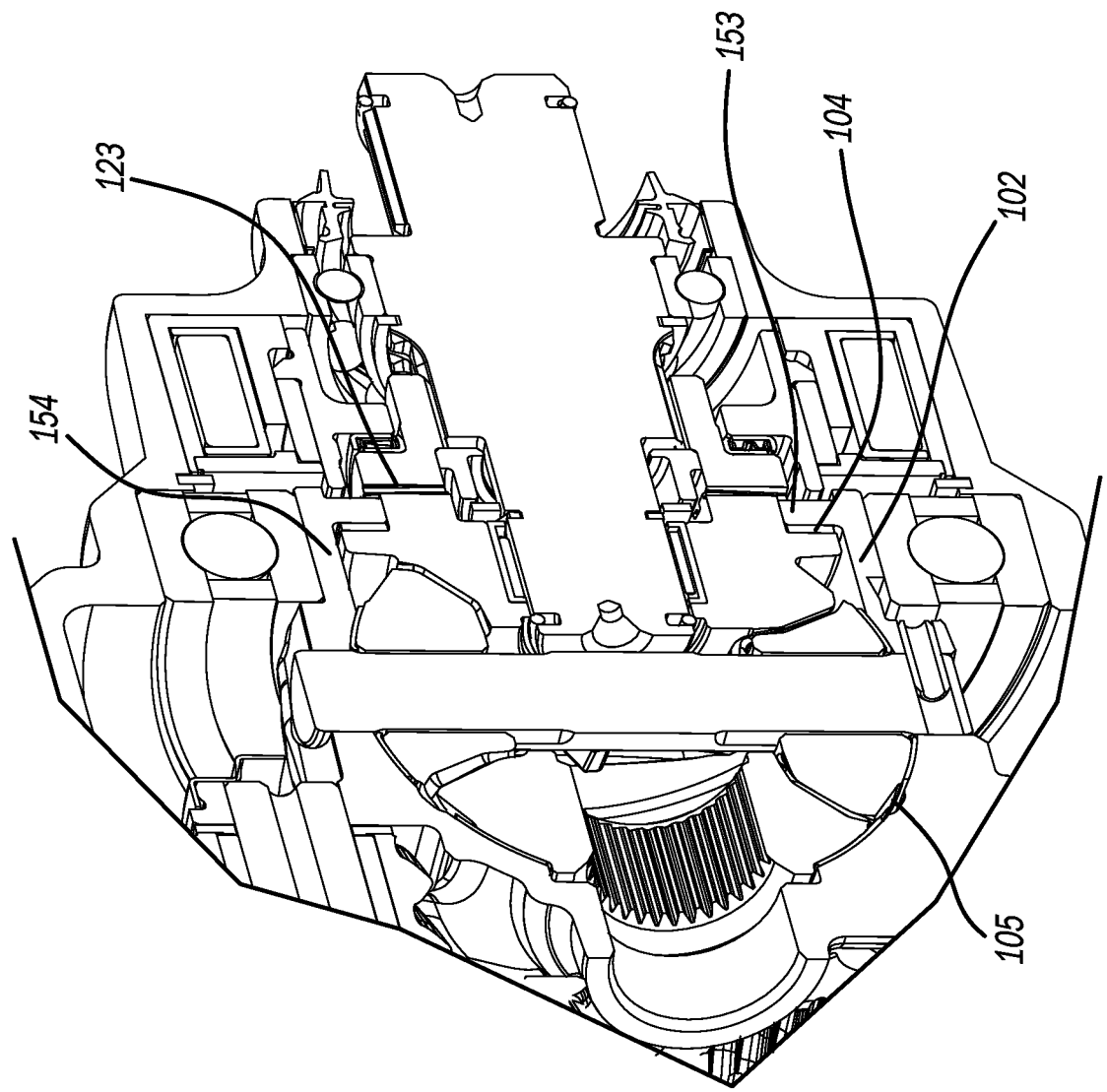
FIG. 4 is an isometric sectional view of the disconnectable differential assembly shown in FIG. 3 taken from a different angle.

FIG. 4 is an isometric sectional view of the disconnectable differential assembly shown in FIG. 1 taken from a different angle with the power-operated side gear disconnect mechanism having an electromagnetic actuator unit operable to selectively shift a clutch unit between a first state and a second state.

Figure 5:
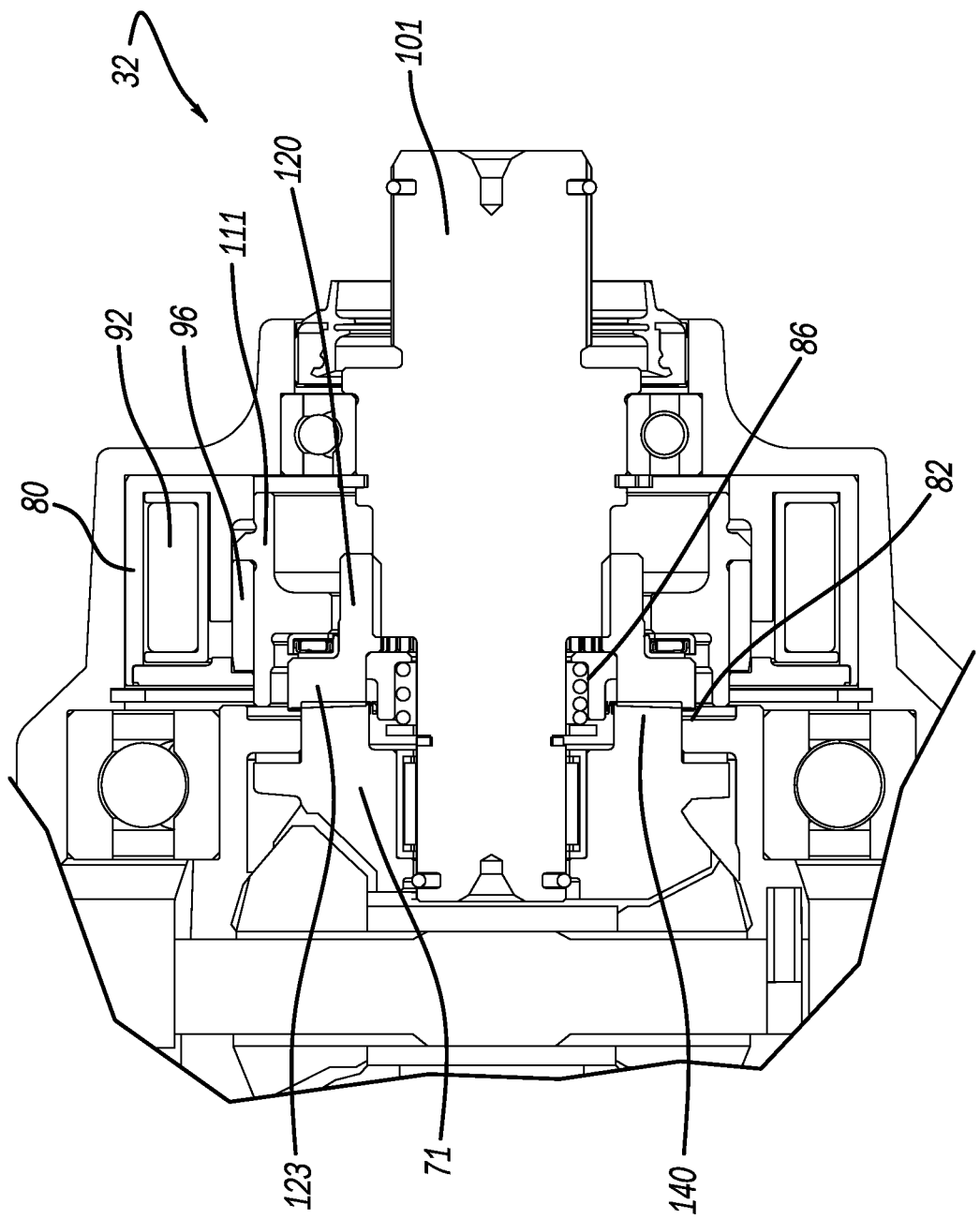
FIG. 5 is a sectional view of the disconnectable differential assembly similar to FIG. 2 showing the side gear disconnect in an engaged position.
Figure 6A:
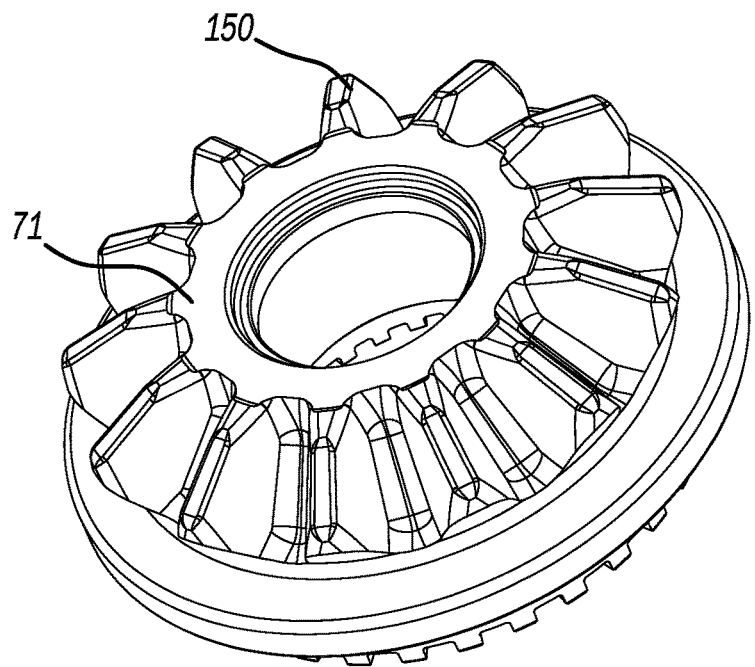
FIG. 6A is an isometric view of one side of the side gear associated with the disconnectable differential assembly of FIG. 2
Figure 6B:
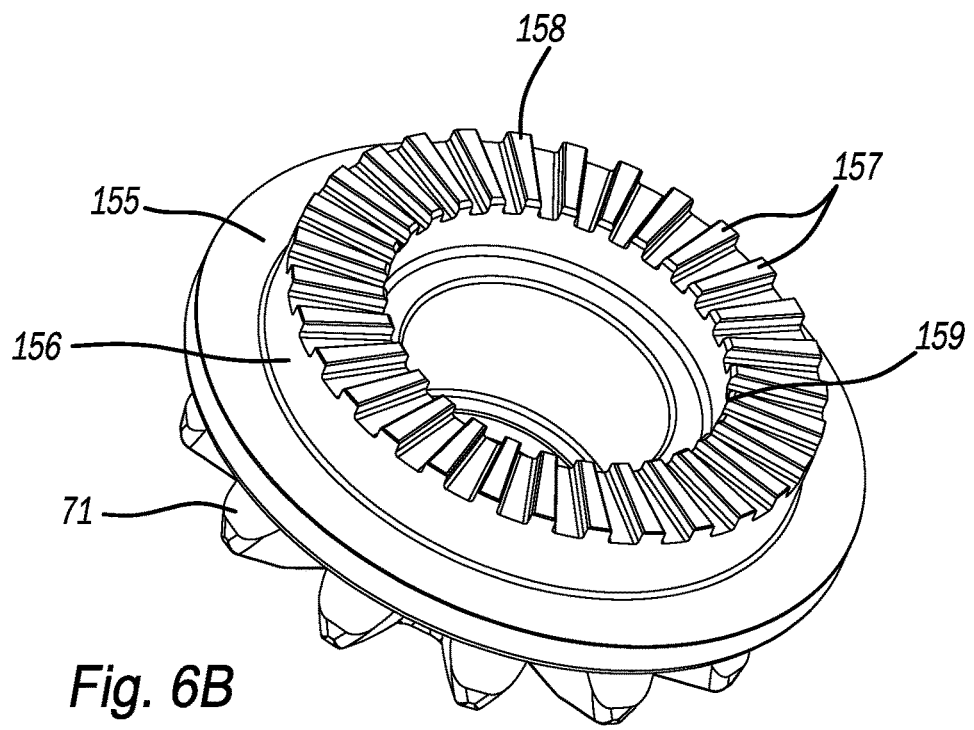
FIG. 6B is an isometric view of the another side of the side gear associated with the disconnectable differential assembly of FIG. 2.
Figure 7A:
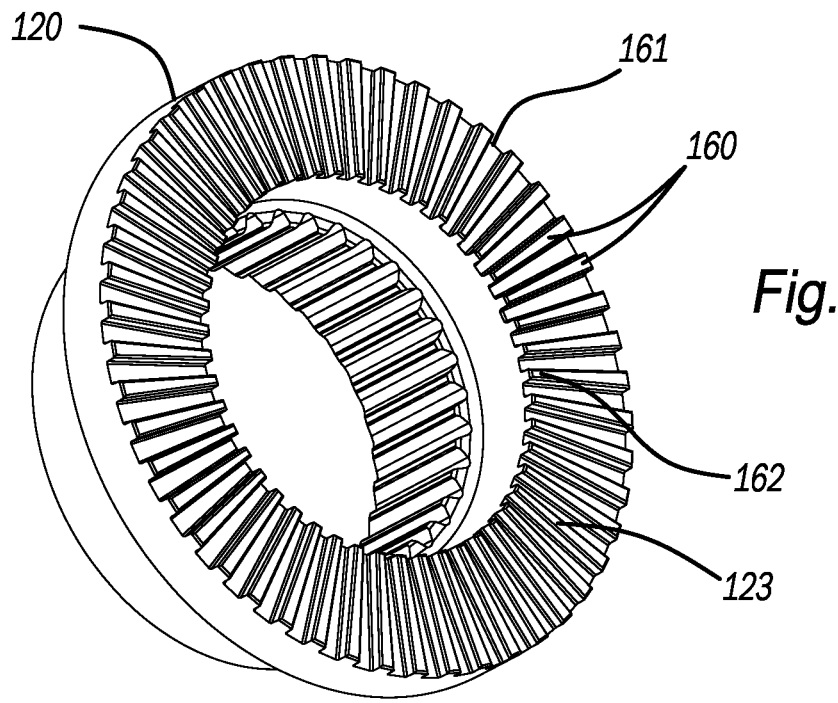
FIG. 7A is an isometric view of one side of the output hub associated with the disconnectable differential assembly of FIG. 2.
Figure 7B:
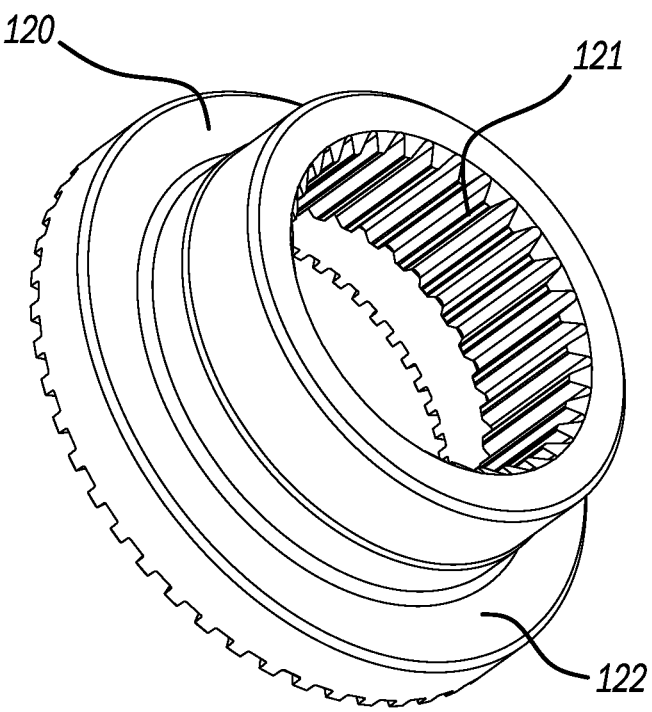
FIG. 7B is an isometric view of another side of the output hub associated with the disconnectable differential assembly of FIG. 2.
Figure 8:
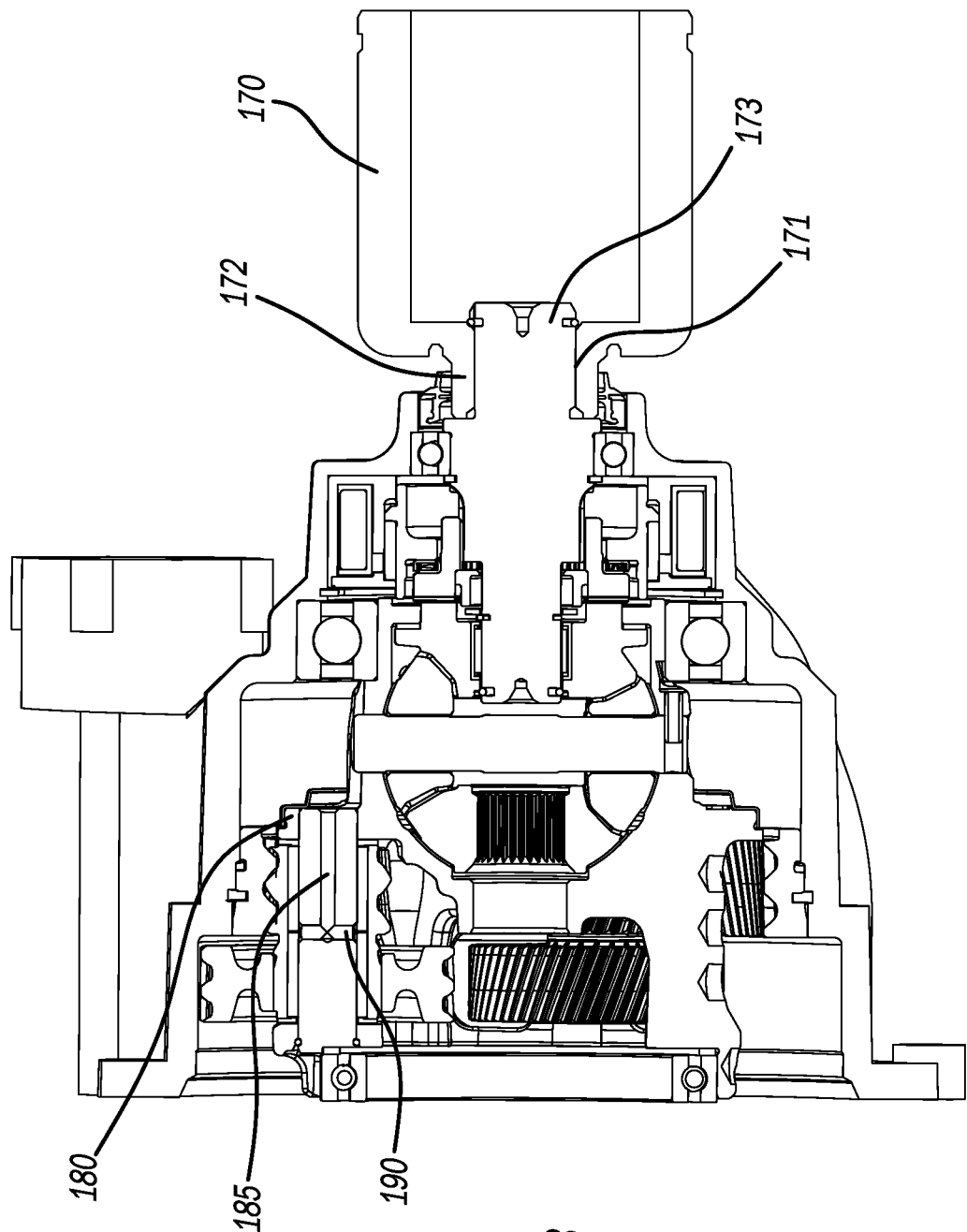
FIG. 8 is a sectional view of an alternative power input arrangement and axle shaft interface of the disconnectable differential assembly shown in FIG. 2.

FIG. 5 is a sectional view of a disconnectable differential assembly similar to FIG. 2 showing the side gear disconnect in an engaged position. FIGS. 6A and 6B are isometric views of the side gear associated with the disconnectable differential assembly of FIG. 2. FIGS. 7A and 7B are isometric views of the output hub associated with the disconnectable differential assembly of FIG. 2. FIG. 8 is a sectional view of an alternative power input arrangement and axle shaft interface of the disconnectable differential assembly shown in FIG. 2.

With initial attention directed to FIG. 1, an exemplary vehicle architecture for an electric vehicle 10 is generally shown to include a primary (i.e. front) electrically-powered drivetrain 12 configured to generate and transmit motive power (i.e., drive torque) to a pair of primary (i.e. front) ground-engaging wheels 14, a secondary (i.e. rear) electrically-powered drivetrain 16 configured to selectively generate and transmit drive torque to a pair of secondary (i.e. rear) ground-engaging wheels 18, and a control system 20 operable to control primary drivetrain 12 and secondary drivetrain 16. Primary drivetrain 12 is schematically shown to include a primary electric motor 22, a transaxle 24 driven by primary electric motor 22, and a pair of primary axleshafts 26 interconnecting primary wheels 14 to a primary differential assembly (not specifically shown) associated with transaxle 24. Drive torque generated by primary electric motor 22 can be multiplied via one or more gearsets within transaxle 24 and delivered to primary wheels 14 to define a two-wheel drive (2WD) mode of vehicle operation.

With continued attention to FIG. 1, secondary drivetrain 16 is schematically shown to include a secondary electric motor 30, a disconnectable side gear differential assembly 32 selectively driven by secondary electric motor 30, and a pair of secondary axleshafts 34 interconnecting secondary wheels 18 to differential assembly 32. As will be described in greater detail, disconnectable side gear differential assembly 32 is generally configured to include a differential housing 52 driven by secondary electric motor 30, a differential mechanism 38 interconnecting secondary axleshafts 34, and a power-operated disconnect mechanism 40 operable for selectively coupling and uncoupling the output hub 120 at the side gear 71 of differential mechanism 38. When disconnect mechanism 40 is operating in a first or "Connected" mode, secondary electric motor 30 transmits drive torque to secondary wheels 18 which, in conjunction with the drive torque transmitted via primary electric motor 22 to primary wheels 14, defines a four-wheel drive (4WD) mode of vehicle operation. Control system 20 is shown schematically to generally include a controller 44 configured to control operation of primary motor 22, secondary motor 30 and power-operated disconnect mechanism 40 in response to a plethora of vehicle inputs (indicated by vehicle sensors 48), and powered by an electric power source (indicated by battery 46).

With particular reference now to FIGS. 2, 3 and 4, a first embodiment of a side gear disconnect differential assembly 32 will be described. Note the side gear disconnect differential assembly in FIGS. 2, 3 and 4 is in the disconnected mode. Differential assembly 32 is generally shown to include a ring gear 50 fixed to differential housing 52 for rotation about a common axis "X". Ring gear 50 is adapted to be driven by an output gear 54 (FIG. 1) of secondary electric motor 30. Differential housing 52 defines a pair of laterally-spaced cylindrical bosses 56A, 56B upon which side gear disconnect differential assembly 32 is rotatably supported in a transmission housing 110 (partially shown) via a pair of laterally-spared bearing assemblies 58A, 58B. An internal cavity 60 is provided within which differential mechanism 38 is supported for rotation about the "X" axis.

Differential mechanism 38 is shown to include a pair of differential pinions 64 rotatably mounted on a pinion post 66 having its opposite ends secured in polar apertures 68 formed in differential housing 52, and an pair of differential side gears 70 and 71 each meshed with both differential pinions 64. Differential side gear 70 and 71 are meshed with differential pinions 64. Differential side gear 70 has internal splines 72 configured to mesh with external splines formed on secondary axleshaft 34. Differential side gear 71 does not have internal splines, instead a radial needle bearing 100, which can alternatively be a bushing, is able to freely rotate about axle stub shaft 101 when in a disconnected mode. The provision of the needle bearing 100 helps ensure the desired radial alignment between the side gear 71 and the output hub at the moment of engagement during actuation. Such a needle bearing is not used in traditional differentials where side gears interface with axle shafts via straight splines that allow for radial clearance.

Side gear 71 is positioned within the differential internal cavity 60, between differential pinion gears 64 and a circlip 99 on the end of axle shaft 101. In particular, the internal cavity 60 has a spherical portion 105 which transitions to a cylindrical cavity portion 102 and closes with an end wall 103. This end wall 103 becomes a thrust surface for axial forces from side gear 71. A thrust bushing 103a is placed between the side gear 71 and the end wall 103 towards the outer edge of the backside of side gear 71. When side gear 71 is connected, which details will be further described later, differential mechanism 38 is drivingly connected to secondary wheels 18 transferring power from ring gear 50 via differential housing 52.

Seen best in FIGS. 2 and 3, power-operated disconnect mechanism 40 is shown to generally include an electromagnetic actuator unit 80, a clutch unit 82, and a biasing arrangement 86. Electromagnetic actuator unit 80 is annular in configuration and is oriented to surround axle stub shaft 101. Electromagnetic actuator unit 80 is non-rotatably and fixed in axial position into the transmission housing 110. A wire (not shown) to power the electromagnetic actuator unit 80 would be connected to the controller 44 and extend out of the transmission housing 110. Electromagnetic actuator unit 80 includes a solenoid 92, a clam-shell pole or core housing 94 encasing and surrounding solenoid 92, and a magnetic plunger 96. Plunger 96 is surrounds and is fixed to armature 111 which is allowed an axially-sliding movement supported by the inner diameters 97A and 97B of core housing 94 The armature 111 has an radially inward extending wall portion 112 that is utilized to contact and transfer force into output hub 120 from plunger 96.

Output hub 120 is L shaped with a cylindrical portion having an inner spline 121 and a radially outward extending portion 122 which has axially extending teeth 123 on the side towards the side gear 71, teeth 123 configured to engage the side gear 71 when the output hub 120 shifts to the left in FIG. 3. On the opposite side of portion 122 is disposed a thrust bearing 104, which is dispoed axially between portion 122 and portion 112 of armature 111. Thus, axial movement of armature 111 when actuated will transfer a thrust force to the output hub 120 while allowing thrust hub 120 to rotate relative to armature 111 via thrust bearing 104.

The thrust bearing 104 is positioned at a common radial location as the axially extending teeth 123 of the output hub and the axially extending teeth 140 of the side gear 71. Thus, a common radial position is established for the inwardly extending portion 112 of the armature 111, the thrust bearing 104, the outwardly extending portion 122 of the output hub, and the teeth 123 and 140, thereby providing a more direct and efficient transfer of thrust force via the plunger 96 ultimately to the side gear 71.

The solenoid 92, plunger 96, and armature 111 are concentrically arranged and axially aligned. The output hub 120 is also concentrically and axially aligned, via the cylindrical sleeve portion that includes internal splines that engage with stub shaft 101.

The output hub 120 is allowed to axially move on the external mating splines 125 of axle stub shaft 101 (which mesh with inner spline 121) dependent on the actuation state of electromagnetic actuator unit 80. Axle stub shaft 101 is supported by ball bearing 126 which is located in transmission housing 110. The axle stub shaft 101 position is controlled by snap ring 127 installed tightly against ball bearing 126 and in a groove 128 of the axle stub shaft. The axle stub shaft external spline 98 further mates to shaft components which will connect to rear wheel 18.

Biasing arrangement 86 comprises a coil spring 130, a reaction plate 131, and a spring retainer 132. Spring retainer 132 has an interference fit with output hub 120 which results in movement of the spring retainer 132 and output hub 120 to be fixed together axially and rotationally. Output hub 120 and spring retainer 132 can also be a single component if desired. The spring retainer 132 is free to move relative to the axle stub shaft 101. When the electromagnetic actuator unit 80 is energized, the output hub 120 and spring retainer 132 will move towards side gear 71 compressing coil spring 130 against reaction plate 131. The reaction plate 131 is fixed in axial position relative to the axle stub shaft by a snap ring 135 due to constant force from coil spring 130. Other spring types (wave, bevel, etc.) and arrangements could be used as long as the solution provides a biasing force to return the output hub 120 back to its disengaged position when the electromagnetic actuator unit 80 is turned off.

The side gear 71 is positioned axially between differential pinion gears 64, a circlip 99 on the end of axle shaft 101, and the differential internal cavity 60. In particular, the internal cavity 60 has a spherical portion 105 which transitions to a cylindrical cavity portion 102 and closes with an end wall 103. This end wall 103 becomes a thrust surface for axial forces from side gear 71. A thrust bushing 103a is placed between the side gear 71 and the end wall 103 towards the outer edge 154 of the backside of side gear 71 due to relative motion occurring when the differential is disconnected. Moving further towards the inner diameter of side gear 71, the back face of the side gear 71 includes a set of axially extending teeth 140 for being engaged by the output hub 20 when actuated. Details of the axially extending teeth 140 will be described in more detail with reference to FIG. 6B. As there is a bearing member 100 between axle stub shaft 101 and side gear 71 not allowing torque transfer, the only way for the differential mechanism 38 to transfer torque is via an actuated clutch unit 82 due to engagement of the axially extending teeth 123 of output shaft 120 and teeth 140 of side gear 71 when electromagnetic actuator unit 80 as been energized.

In accordance with a preferred operational configuration, side gear disconnect differential assembly 32 is normally operable in a Disconnected mode when electromagnetic actuator unit 80 is operating in a "power-off" condition and can be shifted into a Connected mode in response to electromagnetic actuator unit 80 being actuated and placed in a "power-on" condition. More specifically, clutch unit 82 is operating in a "released" state when the Disconnected mode is established and is operating in an "engaged" state or actuated state when the Connected mode is established. The released state of clutch unit 82 is established when biasing arrangement 86 located on the inner diameter of output hub 120 acts on output hub 120 to place it in a retracted position where its axially extending teeth 123 are displaced from engagement with side gear 71 axially extending teeth 140. Such axial movement of output hub 120 to its retracted position causes armature 111 and plunger 96 to be forcibly moved axially to a non-actuated position relative to solenoid 92 due to the interconnection established from output hub 120 thru portion 122 of output hub acting on portion 112 of armature through thrust bearing 104. With output hub 120 located in its retracted position, side gear 71 is not drivingly connected with axle stub shaft 101, whereby differential mechanism 38 is a non grounded open differential. As such, no drive torque is transmitted from secondary electric motor 30 through ring gear 50 and into side gear disconnectable differential assembly 32 to second wheels 18. Axle stub shaft 101 and axle shaft 34 will rotate and be driven by second wheels 18, but due to differential mechanism 38 not being connected to both side gears 71 and 70 and each axle shaft 101 and 34, no drive torque will occur from secondary electric motor 30. Also, no power will be back driven from secondary wheels 18. Instead differential pinions 64 will spin about pinion post 66 driven by side gear 70. Side gear 71 will rotate freely on bearing 100 about axle stub shaft 101 without engaging or driving output hub 120 and axle stub shaft 101.

With particular reference now to FIG. 5, a portion of disconnect differential assembly 32 is shown in an engaged state. In particular, the axially shiftable components of the differential assembly are actuated and shifted to the left in FIG. 5 relative to their position of FIG. 2. When it is desired to transmit torque from secondary electric motor 30 to secondary wheels 18, disconnect differential assembly 32 is shifted into its Connected mode by shifting electromagnetic actuator unit 80 into its power-on condition for energizing solenoid 92. The magnetic circuit generated upon energization of solenoid 92 causes magnetic plunger 96 and armature 111 to move axially from its non-actuated position into an actuated position (to the left in FIG. 5) which, in turn, causes output hub 120 to move from its retracted position into an extended position where axially extending teeth 123 are engaged with axially extending teeth 140 of side gear 71. This actuating movement of output hub 120 compresses biasing arrangement 86. Such movement of plunger 96 and armature 111 to an actuated position and output hub 120 to its extended position, due to energization of solenoid 92, is in opposition to the biasing exerted thereon by biasing arrangement 86. With output hub 120 located and held in its extended position, side gear 71 is drivingly connected to axle stub shaft 101 through the clutch mechanism 82 via intermeshed axially extending teeth of the side gear 71 and output hub 120. As such, drive torque generated by secondary electric motor 30 is transmitted from side gear disconnectable differential assembly 32 to secondary wheels 18 to establish the 4WD mode. Additionally, regeneration of the power supply can be controlled via shifting side gear disconnect differential assembly 32 into its Connected mode when secondary electric motor 30 is not transmitting torque via a regeneration control associated with control system 20.

With particular reference now to FIGS. 6A and 6B, side gear 71 is seen in two isometric views from opposite side. In these views side gear 71 is shown without radial bearing 100, which would be disposed within the middle opening shown. In FIG. 6A, bevel gear teeth 150 which engage to similar bevel gear teeth on differential pinions 64 can be clearly seen. On the opposite side, best shown in FIG. 6B, the axially extending gear teeth 140 are seen as well as the axial face 155 where thrust bearing 104 contacts. Diameter 156 is in a minimum clearance contact with an inner cylindrical portion 153 of differential first wall 103 to help radially position side gear 71 relative to the X axis. Axially extending teeth 140 can be of any engaging tooth form, although a relatively small module (i.e higher number of teeth per length) tooth is shown here, having a tapered angle 157 forming a wider face width at the OD 158 and reducing to a narrower face width at the ID 159 which has been found to assist in reduced engagement times with the axially extending teeth 123 of the output hub 120.

With particular reference now to FIGS. 7A and 7B, output hub 120 is seen in two isometric views from opposite sides. In FIG. 7A, the axially extending teeth 123 can be seen clearly. Corresponding to teeth 140 of side gear 71, teeth 123 also have a tapered angle form 160 from a wider face width at the OD 161 to a narrower face width at the ID 162. Dimensionally the tooth width will be slightly different than teeth 140 to allow some clearance during engagement with the axially extending teeth 140 of side gear 71. This clearance can be adjusted depending on required engagement or ratcheting speeds, as well as allowable backlash in the system.

The design of the axially extending teeth can be adjusted to allow the system to ratchet in case of unintended clutch engagement. This means the teeth will not engage above a predefined rotational speed. Adjustments can be made to the tooth design 123 and 140 in conjunction with biasing arrangement 86 forces to achieve desired delta RPM engagement speed between side gear 71 and output hub 120 based on application requirements. Dimensionally, the tooth width can be slightly different between teeth 123 and 140 to allow some clearance, improving engagement. This clearance can be adjusted depending on required engagement or ratcheting speeds, as well as allowable backlash in the system.

With reference again to FIGS. 2 and 3, the differential assembly 32 has a reduced axial length due to the arrangement of the clutch unit 82 relative to the bearing supports 58A and 126 of the differential assembly 126. As shown in FIG. 3, the clutch unit 82 and actuator unit 80 are disposed inboard relative to bearing support 126 that supports the shaft 101 for rotation. The solenoid 92 is radially outboard of the plunger 96, which is outboard of the armature, which is outboard of the output hub 120. This axial alignment and radial stack-up reduces the axial length of the overall assembly such that they share the same axial space inboard of the axially outermost bearings 126.

The axial alignment and radial stack-up described above is realized via the use of an increased diameter solenoid 92 to accommodate the above-described armature 111 and output hub 120, whose radial flanges are aligned such that the interposed thrust bearing 104 is radially aligned with the teeth of the output hub 120 and side gear 71. The bearings 58B are disposed radially outward form the side gear 71, such that the bearings 58B have an increased diameter, allowing for a further reduction in axial space due to the shared axial space of the bearings 58B and the side gear 71.

The enlarged diameter of the bearings 58B furthermore provides improved access to the side gear 71 and the teeth thereof. By moving the bearings 58B outward to provide improved access, the output hub 120 may therefore also have an increased diameter, allowing for the shaft 101 to be inserted therethrough and splined therewith. Increasing the diameter of the bearings 58B furthermore allows the bearings 58B to be moved axially inward toward the bearings 58A to reduce the span of the bearings supporting the bosses 56A and 56B of the housing 52.

As described above, the enlarged diameter of the bearing 58B and solenoid 92 being generally radially aligned and axially adjacent allows the for the armature 111 and output hub 120 to be concentrically aligned and axially adjacent the teeth of the side gear 71. The position of the thrust bearing 104 between the respective radially extending flange portions of the armature 111 and output hub 120 allows for force to be transferred at the same diameter of the intermeshing teeth of the output hub 120 and side gear 71.

The use of the thrust bearing 104 in the actuation chain allows the armature 111 to remain rotationally stationary as it shifts axially to move the output hub 120 into engagement with the side gear 71, allowing the output hub 120 to rotate relative to the armature 110. The output hub 120 may engage the side gear 71 via their intermeshing teeth and rotate together (when within the desired torque range such that ratcheting is not occurring).

With particular reference now to FIG. 8 a tulip housing 170 has been added to the outboard end of axle stub shaft 101. This tulip housing 170 may house a constant velocity joint (not shown) internally and be further connected to secondary wheels 18 via axle shaft 34. An external spline 171 on the axle stub shaft 101 mates to an internal spline 172 of tulip housing 170 to transfer power. A circlip 173 is used to axially position the tulip housing 170 to the axle stub shaft 101. An alternative input power arrangement to differential 52 is shown. Instead of ring gear 50 driven by an offset electric motor and geartrain, an electric motor is positioned coaxially and drives a planetary gear system 190. In this arrangement, a planetary shaft pin 185 drives flange 180 which is a portion of differential housing 52. This arrangement is purely driven by packaging and the side gear disconnect assembly 32 remains the same as previously described.

Example embodiments of side gear disconnectable differential assemblies of the type configured for use in electrically-powered vehicle powertrains are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A differential assembly for a vehicle in the form of a disconnecting differential assembly comprising;
    a differential case that rotates about a first axis;
    a differential mechanism received in the differential case having a plurality of differential pinions and first and second side gears transmitting power between the differential case and the first and second side gears;
    the first side gear rotationally fixed to a first axle shaft;
    the second side gear with axially extending teeth;
    an output hub with axially extending teeth which is rotationally fixed to a second axle shaft and axially shiftable relative to the second axle shaft toward and away from the second side gear;
    a power operated disconnect mechanism operable in a disconnected mode to uncouple the output hub from the second side gear and in a connected mode to couple the output hub to the second side gear; and
    a control system for controlling operation of the power operated disconnect mechanism;
    wherein the second side gear is supported for rotation on the second axle shaft with a bearing element disposed radially therebetween, and wherein the bearing element radially aligns the output hub and the second side gear for improved connecting and disconnecting therebetween.

2. The differential assembly of claim 1, wherein the bearing element is a needle bearing.

3. The differential assembly of claim 1 further comprising an armature configured for axial movement relative to the second side gear, the armature configured to move the output hub into engagement with the second side gear.

4. The differential assembly of claim 3, wherein the armature has a radially inwardly extending flange portion and the output hub has a radially outwardly extending flange portion, where the respective flange portions are radially aligned and axially offset, wherein an axial moving force is transmitted therebetween.

5. The differential assembly of claim 4, further comprising a thrust bearing disposed axially between the flange portions of the armature and the output hub, wherein the armature is rotationally stationary and the output hub is rotatable relative to the armature.

6. The differential assembly of claim 4, wherein the flange portions are radially aligned with the axially extending teeth of the output hub and the second side gear, such that force is transferred from the armature to the teeth of the second side gear at the same radial location and diameter.

7. The differential assembly of claim 3, wherein the output hub is biased axially away from the second side gear and is normally disconnected.

8. The differential assembly of claim 3, further comprising a solenoid disposed radially outward from the armature and a plunger mounted to the armature, wherein actuation of the solenoid shifts the plunger and armature toward the output hub and the output hub toward the second side gear.

9. The differential assembly of claim 8, wherein the solenoid, the plunger, the armature, and a sleeve portion of the output hub are concentrically arranged and axially aligned and arranged to define a radial stack-up surrounding the second axle shaft.

10. The differential assembly of claim 9, wherein the radial stack-up is disposed axially inboard relative to an axially outer bearing support that supports the second axle shaft for rotation.

11. The differential assembly of claim 10, wherein the radial stack-up is arranged axially between the axially outer bearing support and a further bearing support that supports a housing of the differential assembly.

12. The differential assembly of claim 11, wherein the axially outer bearing support is a first bearing support and the further bearing support is one of two bearing supports including a second bearing support and a third bearing support supporting opposite sides of the housing of the differential assembly, wherein the two bearing supports define an axial span, and the second bearing support is disposed radially outward relative to the first bearing support.

13. The differential assembly of claim 12, wherein the second bearing support is disposed radially outward from the second side gear and is axially aligned with the second side gear, wherein the second bearing support is radially aligned with the solenoid.

14. The differential assembly of claim 12, wherein the second bearing support is disposed radially outward relative to the third bearing support.

15. The differential assembly of claim 11, wherein the axially outer bearing support is disposed radially inward relative to the solenoid.

16. A differential assembly for a vehicle in the form of a disconnecting differential assembly comprising:
a differential case that rotates about a first axis;
a differential mechanism received in the differential case having a plurality of differential pinions and first and second side gears for transmitting power between the differential case and the first and second side gears;
the first side gear rotationally fixed to a first axle shaft;
the second side gear with axially extending teeth;
an output hub with axially extending teeth which is rotationally fixed to a second axle shaft and axially shiftable relative to the second axle shaft toward and away from the second side gear;
a power operated disconnect mechanism operable in a disconnected mode to uncouple the output hub from the second side gear and in a connected mode to couple the output hub to the second side gear;
a control system for controlling operation of the power operated disconnect mechanism; and
an armature configured for axial movement relative to the second side gear so as to move the output hub into engagement with the second side gear;
wherein the armature has a greater axial length than the output hub and the armature axially overlaps the entire axial extent of the output hub and is disposed radially outward relative to the output hub.

17. The differential assembly of claim 1, wherein the output hub has a diameter such that the second axle shaft extends therethrough and is splined therewith.

18. The differential assembly of claim 12, wherein the second bearing support is disposed radially outward relative to the second side gear.

19. The differential assembly of claim 18, wherein the second side gear is fully accessible in an axial direction through the second bearing support.

20. A differential assembly for a vehicle in the form of a disconnecting differential assembly, comprising:
a differential case that rotates about a first axis;
a differential mechanism received in the differential case having a plurality of differential pinions and first and second side gears for transmitting power between the differential case and the first and second side gears;
the first side gear rotationally fixed to a first axle shaft;
the second side gear having axially extending teeth;
an output hub having axially extending teeth which is rotationally fixed to a second axle shaft and is axially shiftable relative to the second axle shaft toward and away from the second side gear;
a power operated disconnect mechanism operable in a disconnected mode to uncouple the teeth on the output from the teeth on the second side gear and in a connected mode to couple the teeth of the output hub to the teeth of the second side gear;
a control system for controlling operation of the power operated disconnect mechanism;
an armature configured for axial movement relative to the second side gear, the armature configured to move the output hub into engagement with the second side gear; and
a solenoid disposed radially outward from the armature and a plunger mounted to the armature, wherein actuation of the solenoid shifts the plunger and armature toward the output hub and the output hub toward the second side gear;
wherein the solenoid, the plunger, the armature, and a sleeve portion of the output hub are concentrically arranged and axially aligned to define a radial stack-up surrounding the second axle shaft.

21. The differential assembly of claim 20, wherein the radial stack-up is disposed axially inboard relative to an axially outer bearing support configured to rotatably support the second axle shaft, wherein the radial stack-up is axially arranged between the axially outer bearing support and a further bearing support that supports a housing of the differential assembly, wherein the axially outer bearing support is a first bearing assembly and the further bearing support is one of a second bearing assembly and a third bearing assembly supporting opposite sides of the housing of the differential assembly, and wherein the second and third bearing assemblies define an axial span and the second bearing assembly is disposed radially outward relative to the first bearing assembly.

22. The differential assembly of claim 21, wherein the first bearing assembly is disposed radially inward relative to the solenoid, wherein the second bearing assembly is disposed radially outward relative to the second side gear and is axially aligned with the second side gear and is radially aligned with the solenoid, and wherein the second bearing assembly is disposed radially outward relative to the third bearing assembly.

23. A differential assembly for a vehicle in the form of a disconnecting differential assembly, comprising:
- a differential case that rotates about a first axis;
- a differential mechanism received in the differential case and having a plurality of differential pinions meshed with first and second side gears for transmitting power between the differential case and the first and second side gears;
- the first side gear being rotationally fixed to a first axle shaft;
- the second side gear having axially extending teeth;
- an output hub with axially extending teeth and which is rotationally fixed to a second axle shaft and axially shiftable relative to the second axle shaft toward and away from the second side gear;
- a power operated disconnect mechanism operable in a disconnected mode to uncouple the teeth on the output hub from the teeth on the second side gear and in a connected mode to couple the teeth on the output hub to the teeth of the second side gear;
- a control system for controlling operation of the power operated disconnect mechanism;
- an armature configured for axial movement relative to the second side gear, the armature configured to move the output hub into engagement with the second side gear, the armature having a radially inwardly extending flange portion and the output hub having a radially outwardly extending flange portion such that the respective flange portions are radially aligned and axially offset such that an axial moving force is transmitted therebetween; and
- a thrust bearing disposed axially between the flange portions of the armature and the output hub, wherein the armature is rotationally stationary and the output hub is rotatable relative to the armature.

24. The differential assembly of claim 23 wherein the flange portions are radially aligned with the axially extending teeth of the output hub and the second side gear, and wherein the output hub is biased away from the seconds side gear and is normally disconnected to establish the disconnected mode.

* * * * *